July 31, 1934.     J. F. O'BRIEN     1,968,464
IGNITION SYSTEM TESTER
Filed May 8, 1931     2 Sheets-Sheet 2
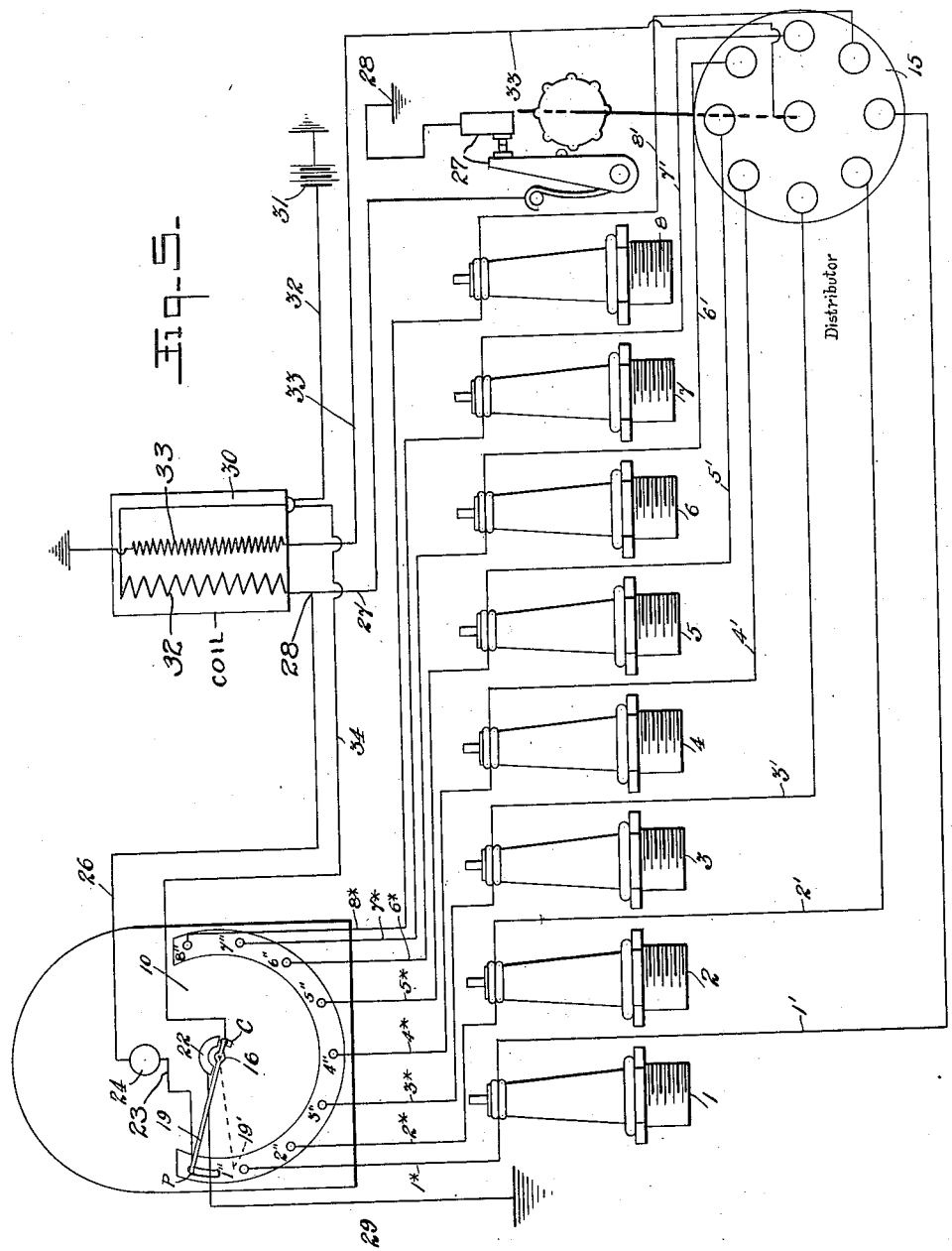

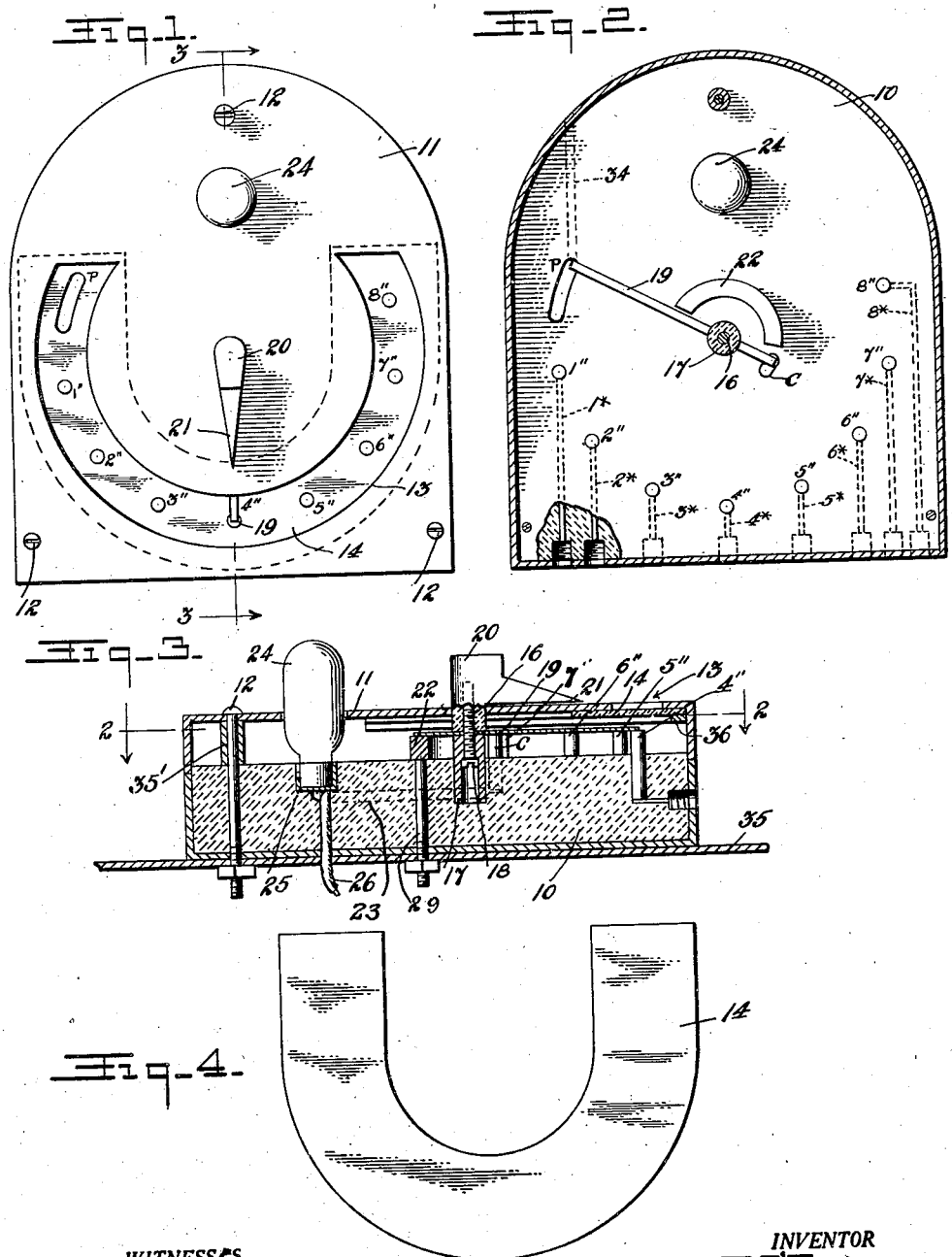

Patented July 31, 1934

1,968,464

UNITED STATES PATENT OFFICE 1,968,464

IGNITION SYSTEM TESTER

James F. O'Brien, Philadelphia, Pa.

Application May 8, 1931, Serial No. 535,909

2 Claims. (Cl. 175—183)

This invention relates to ignition system testers, and has for an object to provide an organization by means of which the ignition system of an internal combustion engine and more particularly the power plant of an automotive vehicle may be tested at various points between the battery and the ignition, and all from the dash or some point convenient to the operator.

A further object of the invention is to provide an organization, by the use of which, any one of the spark plugs of an ignition system may be selectively short circuited to test its efficiency.

A further object of the invention is to provide in the same organization means for testing the efficiency of the distributor.

A further object of the invention is to provide in the same organization means for testing the efficiency of the coil.

The invention therefore comprises a movable switch, having connection independently with each of the spark plugs of the ignition system, and adapted, when properly positioned, to short circuit the particular selected plug, with further means for determining visually whether the breaker points and other current controlling structure of the distributor are properly functioning, and with a further means for testing the coil as to whether or not it is functioning, such structure comprising a manually oscillatable switch member, making contact at various spaced positions for the purposes noted.

This invention is directed to other objects and possesses other features of novelty and advantage, some of which, together with the foregoing, will be hereinafter more fully set forth.

In the drawings:—

Figure 1 is a view of the testing apparatus in front elevation,

Figure 2 is a view of the testing apparatus with the cover removed,

Figure 3 is a sectional view through the testing apparatus, taken on line 3—3 of Figure 1, Figure 4 is a plan view of the transparent sheet for disclosing the underlying parts, and Figure 5 is a diagrammatic view of the installation showing the several circuits and connections.

Like characters of reference indicate corresponding parts throughout the several views.

The improved ignition system tester, comprises a body or block 10 of insulating material, having a cover member 11, secured thereto in any usual and approved manner, here shown as by the screw 12. The cover embodies an arcuate slit 13 with an underlying transparent sheet 14, through which a segment of the block 10 and contacts to be hereinafter described are visible.

The several spark plugs, conventionally shown at Figure 5, and numbered 1, 2, 3, 4, 5, 6, 7, and 8, are intended to represent the spark plugs of an eight cylinder engine. It is obvious, of course, that these spark plugs may be varied in number according to the number of cylinders to which the device is applied. The distributor 15, conventionally shown at Figure 5, has the various contacts connected with the several spark plugs respectively by wires 1', 2', 3', 4', 5', 6', 7', and 8'. The several spark plugs just above enumerated are connected respectively through the wires 1*, 2*, 3*, 4*, 5*, 6*, 7*, and 8*, with the contacts 1'', 2'', 3'', 4'', 5'', 6'', 7'', and 8'' located upon the block 10. These contacts 1''-8'' are arranged in the arc of a circle about the pintle 16 which is pivoted in the block 10 in any approved manner as by providing a bushing 17 and the pintle with a head 18, as shown at Figure 3. Attached to this pintle in any approved manner as by riding upon the bushing 17, a switch arm 19 is provided to turn with the pintle 16, and a handle 20 with a pointer 21 is rigidly attached to the pintle 16 so that it will rotate in consonance with the switch arm 19.

Formed as an arc about the pintle 16, is a segmental contact member 22, so positioned, that except at one position as shown at Figure 2, the switch arm 19 will be in engagement with said arcuate contact upon one or the other side of the pintle 16. As shown at Figure 2, the shorter end of the switch arm 19 is in engagement with the contact C, and its opposite or longer end in engagement with the contact P. The contact P is provided with a wire 23 which extends to the lamp unit 24, which is visible through the cover member 11. This may be extended upwardly through the cover as shown at Figure 3, or as conditions may make desirable. The lamp is seated in a socket 25 and is connected by the wire 26, with the wire 27, which is grounded at 28 through the make-and-break 27' in the usual manner. The segmental contact 22 is also grounded through the wire 29.

As this device is intended also for testing the efficiency of the coil, such a coil is represented conventionally at 30, the current from the battery 31 is conducted to the primary 32 by the wire 32'. From the secondary 33 of the coil, the wire 33' extends to the distributor 15 in the usual manner. The wire 34 from the coil also extends to the contact C.

The physical make-up, shape and contour of the unit, represented at Figure 1, may be in accordance with any predetermined plan, and the showing in the drawings is considered no limitation.

However, as shown, the member 35 is assumed to be a metal dash of an ordinary automobile construction, and the grounding 29, as represented at Figure 3, is through the bolt connecting the segmental contact 22, therefore directly with the metal dash, which is, of course, likewise grounded. The cover member 11 may be spaced from the block 10 by any approved type of spacers, one of which is shown at 35', and the transparent sheet 14 may be held in position by a spring ring or segment 36. As these physical features, however, are relatively unimportant, they may be varied according to the construction of the device and whim of the maker.

In operation, the testing of the spark plugs will be by short circuiting such plugs individually. At the present time, this manner of testing spark plugs is well known, but is usually carried out by simply short circuiting each plug individually by the use of a metallic connection between the tip of the plug and the engine block. In practice, this implement is usually a screw driver, and must be separately applied by the mechanic. In applicant's device, this short circuiting is similarly carried out but by the operator of the car and without leaving his seat. At Figure 1, the switch arm 19 is shown in engagement with the contact 4″. This, through the wire 4* and the connection of the switch arm 19 with the segment 22, will ground that particular spark plug No. 4.

The grounding of the spark plug will, of course, render such plug inactive, and the sound of the operation of the motor with such plug grounded or short circuited, will be interpreted as at present to indicate whether or not such plug is normally properly functioning. Placed upon any one of the other contacts from 1″ to 8″ inclusive, the action upon the corresponding spark plugs will be identical, and the several plugs may be thereby tested rapidly, conveniently, and in such succession as the operator may wish.

If, upon testing the spark plugs, they are found operating satisfactorily, the next step of the test is whether the distributor and breaker points are properly set and functioning.

By rotating the switch arm 19 into engagement with the contacts P and C, circuit is established from the battery 31 through the wires 32' and 34 to contact C, through the switch arm 19 to contact P, through the wire 23, lamp 24, wires 26 and 27 to the make-and-break 27' to ground 28.

Each make-and-break will, therefore, be represented by flickering of the lamp 24, and if such flickering is found to be uniform in time and brilliancy, then it is to be assured that the points are properly breaking.

To test the coil, the arm 19 is swung about to some one of the contacts 1″-8″ as for instance, to the contact 1″, and the engine turned over either by hand, or by using the starter, preferably, the latter. By moving the arm 19 slightly away from this contact 1″, a spark will jump if the secondary of the coil is efficient. With the engine stationary if some one of said contacts are in circuit by reason of the position of the breaker points of the distributor, the secondary of the coil may be tested without turning the engine over by moving the arm 19 away from such live contact. It is obvious, of course, that the light 24, controlled through the contact P, must be on the primary of the coil, and the lighting of this light will indicate that current is served to the primary and by shifting to a live contact as above noted, the proper functioning of the secondary of the coil is demonstrated.

It will be thus seen, that by the very simple contrivance located conveniently to the hand of the operator, every unit of the ignition system may be separately and definitely tested.

Of course, the ignition system tester, herein illustrated, may be modified in various ways without departing from the invention herein set forth and hereinafter claimed.

The invention is hereby claimed as follows:—

1. In an ignition system tester, a control box, an insulating block within the box, a series of contacts arranged along an arc upon the block, a switch arm pivoted to the block at the center of arcature of and adapted to selectively engage the contacts, said box having a curvilinear sight opening disclosing the contacts and the engaging extremity of the arm, a handle upon the exterior of the box connected to and in alinement with the arm, circuits including said arm and some of said contacts forming a testing system to be combined with the ignition system, a circuit including another contact and another part of the testing system, and an illuminating element carried by said block and included in said last mentioned circuit.

2. In an ignition system tester, a control box, an insulating block within the box, a series of contacts arranged along an arc upon the block, conductors from said contacts to the side of the box, a switch arm pivoted to the block at the center of arcature of and adapted to selectively engage the contacts, said box having a curvilinear sight opening disclosing the contacts and the engaging extremity of the arm, a handle upon the exterior of the box connected to and in alinement with the arm, circuits including said arm and some of said contacts forming a testing system to be connected with the ignition system, a circuit including another contact and another part of the testing system, and an illuminating element carried by said block and included in said last mentioned circuit, all of said circuits including said conductors.

JAMES F. O'BRIEN.